United States Patent
Cai et al.

(10) Patent No.: US 11,968,467 B2
(45) Date of Patent: Apr. 23, 2024

(54) READ CIRCUIT FOR IMAGE SENSOR

(71) Applicant: Chengdu Image Design Technology Co., Ltd., Chengdu (CN)

(72) Inventors: Hua Cai, Chengdu (CN); Zheng Chen, Chengdu (CN); Tian Xia, Chengdu (CN); Fei Chen, Chengdu (CN)

(73) Assignee: CHENGDU IMAGE DESIGN TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/894,192

(22) Filed: Aug. 24, 2022

(65) Prior Publication Data

US 2023/0370740 A1    Nov. 16, 2023

(30) Foreign Application Priority Data

May 16, 2022   (CN) .......................... 202210530842.2

(51) Int. Cl.
    *H04N 25/75* (2023.01)
(52) U.S. Cl.
    CPC .................................. *H04N 25/75* (2023.01)
(58) Field of Classification Search
    CPC ...... H04N 25/75; H04N 25/78; H04N 23/651; H04N 23/667; H04N 25/772
    See application file for complete search history.

(56) References Cited

U.S. PATENT DOCUMENTS

| | | | | |
|---|---|---|---|---|
| 2013/0341489 | A1* | 12/2013 | Yoshida | H03M 1/34 250/208.1 |
| 2015/0076325 | A1* | 3/2015 | Higuchi | H04N 25/60 327/134 |
| 2015/0303937 | A1* | 10/2015 | Gou | H04N 25/78 341/161 |
| 2016/0191069 | A1* | 6/2016 | Gou | H03M 1/0695 341/118 |
| 2019/0115931 | A1* | 4/2019 | Hurwitz | H03M 1/56 |
| 2020/0036931 | A1* | 1/2020 | Abe | H03M 1/56 |

* cited by examiner

*Primary Examiner* — Jason A Flohre
(74) *Attorney, Agent, or Firm* — Andrew C. Cheng (57) ABSTRACT

A read circuit for an image sensor includes: a first analog-to-digital conversion unit configured to perform successive approximation high-bit analog-to-digital conversion on collected pixel data to obtain high-bit conversion data and residual pixel data; and a second analog-to-digital conversion unit electrically connected to the first analog-to-digital conversion unit and configured to perform single-slope low-bit analog-to-digital conversion on the residual pixel data to obtain low-bit conversion data, wherein a sum of a first conversion accuracy of the first analog-to-digital conversion unit and a second conversion accuracy of the second analog-to-digital conversion unit is equal to a preset conversion accuracy for the pixel data. In accordance with the read circuit, a high image conversion frame rate of the pixel data can be achieved with lower power consumption and less circuit area, and the conversion cycle of the pixel data is effectively shortened.

13 Claims, 6 Drawing Sheets

READ CIRCUIT FOR IMAGE SENSOR

CROSS REFERENCE TO THE RELATED APPLICATIONS

This application is based upon and claims priority to Chinese Patent Application No. 202210530842.2, filed on May 16, 2022, the entire contents of which are incorporated herein by reference.

TECHNICAL FIELD

The disclosure relates to the technical field of integrated circuit design, and in particular relates to a read circuit for an image sensor.

BACKGROUND

CMOS image sensor (CIS), which is an image sensor based on complementary metal oxide semiconductor technology, has been widely used in videos, surveillance, industrial manufacturing, automobiles, home appliances and other imaging fields at present. As the demands for CIS applications continue to escalate in recent years, the requirements for resolution, frame rate and image quality of the CIS continue to increase. How to complete high-quality image data conversion and transmission within a short time has become a hot research topic. A mainstream read circuit structure for the CIS is a read circuit based on a column-level single-slope analog-to-digital converter (SS-ADC), which ensures that the CIS has an enough conversion accuracy and conversion speed under reasonable area and power consumption overhead. However, a 12-bit SS-ADC needs at least 4,095 conversion cycles. Under the high-frame-rate and high-resolution application, an ADC counter needs to have extremely high clock frequency to meet the requirement of short conversion time, the power consumption is correspondingly increased as the frequency increases, which is not allowed for some low-power-consumption applications. A successive approximation register analog to digital converter (SAR-ADC) is employed in some applications to replace the SS-ADC. Although the high conversion rate is solved by the SAR ADC, due to the fact that the SAR-ADC corresponds to each column needs a DAC consisting of a switched capacitor array, the switched capacitor array may occupy a large area when the resolution of the CIS is high.

Therefore, it is necessary to provide a novel read circuit for an image sensor to solve the problems existing in the prior art.

SUMMARY

The purpose of the disclosure is to provide a read circuit for an image sensor, which can achieve a high image conversion frame rate of the pixel data with lower power consumption and less circuit area, and effectively shortens the conversion cycle of the pixel data.

To achieve the objective, a read circuit for an image sensor provided by the disclosure includes:
a first analog-to-digital conversion unit configured to perform successive approximation high-bit analog-to-digital conversion on collected pixel data to obtain high-bit conversion data and residual pixel data;
a second analog-to-digital conversion unit electrically connected to the first analog-to-digital conversion unit and configured to perform single-slope low-bit analog-to-digital conversion on the residual pixel data to obtain low-bit conversion data;
wherein a sum of a first conversion accuracy of the first analog-to-digital conversion unit and a second conversion accuracy of the second analog-to-digital conversion unit is equal to a preset conversion accuracy for the pixel data.

The read circuit for the image sensor has the beneficial effects that, within the preset conversion accuracy, the first analog-to-digital conversion unit performs successive approximation high-bit conversion on the collected pixel to obtain the high-bit conversion data and the residual pixel data, and then the second analog-to-digital conversion unit performs single-slope low-bit analog-to-digital conversion on the residual pixel data to obtain the low-bit conversion data, thereby completing the analog-to-digital conversion process of the pixel data. Compared with the traditional single-slope conversion mode, by combining a successive approximation conversion mode and a single-slope conversion mode, the data conversion cycle is greatly shortened, a high output frame rate is conveniently achieved under a high resolution, and the circuit power consumption and the circuit area are effectively reduced.

Alternatively, the first analog-to-digital conversion unit includes a switched capacitor array, a comparison module, and a control logic module, wherein the control logic module is electrically connected to the switched capacitor array so as to control a polar plate voltage of the switched capacitor array, a first input end of the comparison module is electrically connected to the switched capacitor array, a comparison reference voltage is input at a second input end of the comparison module so as to be compared with a voltage signal input at the first input end of the comparison module, and an output end of the comparison module is electrically connected to the control logic module so as to output the high-bit conversion data via the control logic module.

Alternatively, the switched capacitor array includes a first capacitor, K number of second capacitors, and K number of changeover switches, wherein K represents a positive integer. One end of the first capacitor and one end of each of the second capacitors are connected to the first input end, the other end of the first capacitor is used for the input of a ramp signal, and the other end of each of the second capacitors is electrically connected to a fixed end of one of the changeover switches; the changeover switch has at least two switching ends at which a first reference voltage and a second reference voltage are respectively input; and the control logic module is electrically connected to the changeover switch so as to switch voltage signals input by the changeover switch.

Alternatively, a capacitance value of the first capacitor is C, a capacitance value of the i-th second capacitor is $2^{i-1}C$ wherein i is not less than 1 and not more than K, and both i and K are natural numbers.

Alternatively, each of the second capacitors is in one-to-one correspondence with each of the changeover switches, and the second reference voltage is greater than the first reference voltage.

Alternatively, the comparison reference voltage is equal to a difference between the first reference voltage and the second reference voltage.

Alternatively, the second analog-to-digital conversion unit includes a counting module, wherein the output end of the comparison module is connected to an input end of the counting module, and the counting module outputs the low-bit conversion data after stopping counting.

Alternatively, the read circuit for the image sensor further includes an output unit, wherein the output unit is electrically connected to an output end of the counting module and an output end of the control logic module respectively so as to obtain the high-bit conversion data and the low-bit conversion data and unify the high-bit conversion data and the low-bit conversion data into complete data corresponding to an electric potential of the pixel data.

Alternatively, the read circuit for the image sensor further includes a control switch, wherein the control switch is electrically connected to the first input end of the comparison module.

Alternatively, the read circuit for the image sensor further includes a row selection decoding driving unit, a ramp generator, and a sequential control unit, wherein an output end of the ramp generator is connected to the first capacitor so as to input the ramp signal, an output end of the sequential control unit is connected to an input end of the ramp generator, the sequential control unit is connected to an input end of the row selection decoding driving unit, and an output end of the row selection decoding driving unit is connected to a pixel cell.

DETAILED DESCRIPTION OF THE EMBODIMENTS

In order to make objectives, technical solutions, and advantages of the disclosure clearer, the technical solutions in the disclosure are described clearly and completely in the following with reference to accompanying drawings in the embodiments of the disclosure. Apparently, the described embodiments are only part rather than all of the embodiments of the disclosure. On the basis of the embodiments of the disclosure, all other embodiments acquired by those of ordinary skill in the art without making creative efforts fall within the scope of protection of the disclosure. Unless otherwise mentioned, all technical and scientific terms used herein should have the same meaning as commonly understood by those of ordinary skill in the art to which the disclosure belong. As used herein, "comprising", "including" and the similar words mean that elements or articles appearing before the word encompass the elements or articles or equivalents thereof listed after the word, but do not exclude other elements of articles.

Figure 1:
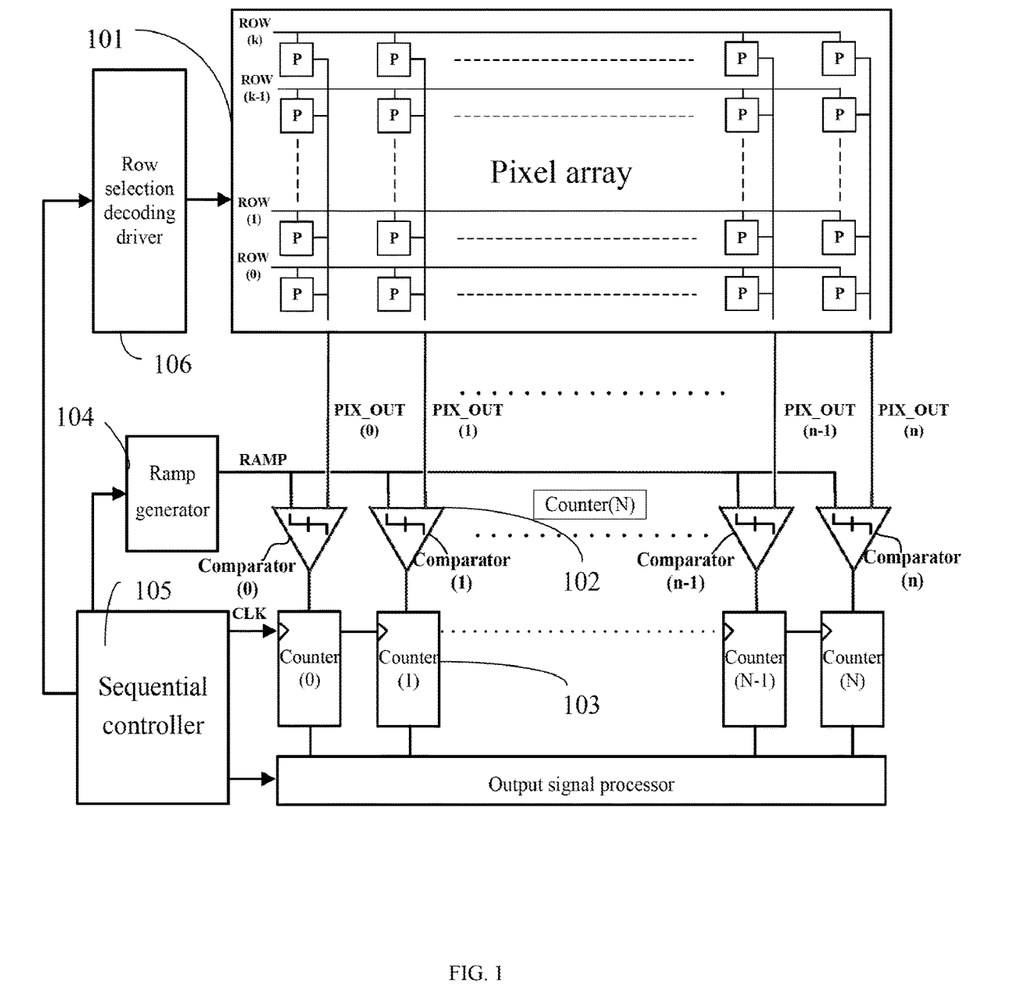
FIG. 1 is a circuit diagram of a read circuit in the prior art.

In the prior art, refer to FIG. 1, an existing read circuit usually includes a pixel array 101, a comparator 102, a counter 103, a ramp generator 104, a sequential controller 105, a row selection decoding driver 106, and an output signal processor 107. The pixel array 101 is composed of a plurality of pixel circuits P arranged in an array, and the comparator 102 and the counter 103 form an analog-to-digital converter ADC. The pixel array 101 is read row by row, with a specific sequence as follows: ROW(0), ROW(1), . . . , ROW(k−1), ROW(k). Each column of the pixel array 101 has an output bus, respectively PIX_OUT(0) PIX_OUT(1), PIX_OUT(n−1), PIX_OUT(n). The PIX OUT output is connected to the ADC. The comparator 102 compares the pixel output with a ramp signal RAMP, and a comparison result decides a counting value of the counter 103. The ADC judges electric potentials at VRST (Reset signal quantization phase) and VSIG (Signal integration quantization phase) (Referring to FIG. 2), and converts a difference between the VRST and the VSIG into digital quantity to output to the system.

Figure 2:
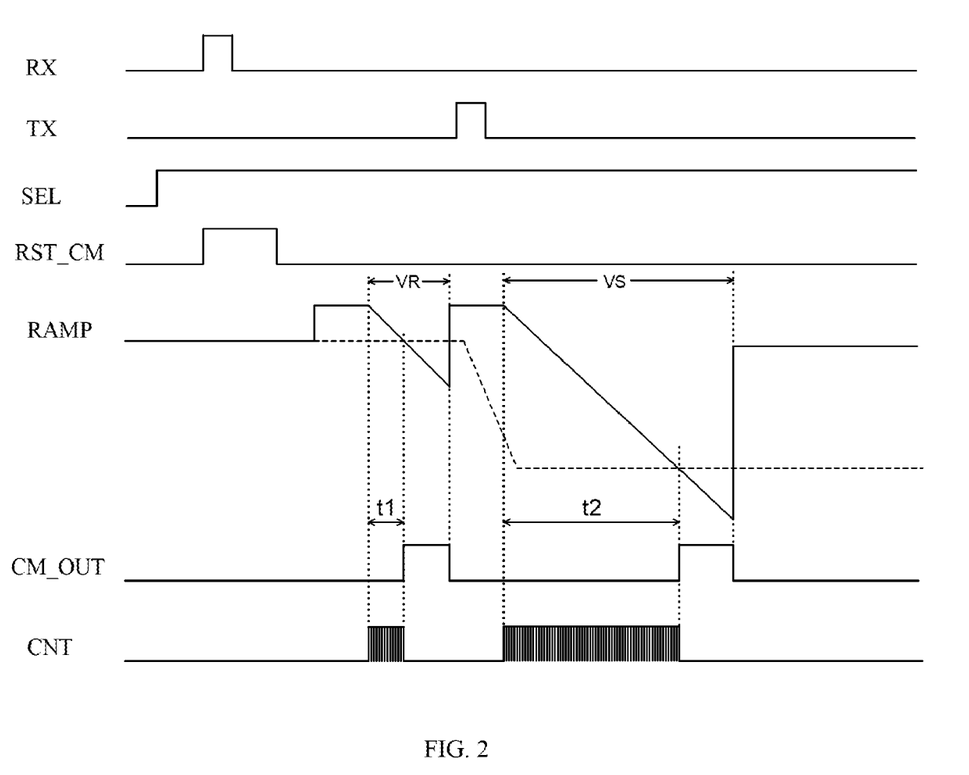
FIG. 2 is an operation sequence diagram of a read circuit in the prior art.

Specifically, the sequence diagram is combined for illustration. Refer to FIG. 2, FIG. 2 illustrates an operation sequence corresponding to the read circuit shown in FIG. 1, that is, FIG. 2 is a read phase operation sequence of FIG. 1. After entering the Read phase, a selective signal SEL is pulled up to "high", and then a receiving signal RX is pulled to "high" to reset the pixel cell. Then the receiving signal RX and a reset signal RST_CM change from "high" to "low", EN_CM is an enable control signal of the comparator, and the comparators 102 in all the ADCs get into operation when the EN_CM is "high". An operation process of the ADC consists of a comparison process and a counting process. At first, the counter CNT starts counting when the ramp signal RAMP starts falling, and the CNT stops counting and stores a current counting value until the comparator 103 signal flips from "low" to "high". The ADC needs to perform the above operation twice to complete the analog-to-digital conversion of the pixel signal, the ramp signal RAMP may be generated twice as ADC references. At a first ramp phase (i.e., a "VR" phase in FIG. 2), the ADC judges according to the RAMP signal and stores a reset electric potential VRST, and the counter CNT counts in the t1 time and stores a counting value CN1 corresponding to the t1 time period. At a second ramp phase (i.e., the "VS" phase in FIG. 2), the ADC judges and stores a reset potential VSIG, and the counter CNT counts in the time t2 and stores a counting value CN2 corresponding to the t2 time period. The counter CNT finally outputs a difference ΔCN=CN2−CN1 of the counting values to correspond to the difference of the VSIG-VRST.

Figure 3:
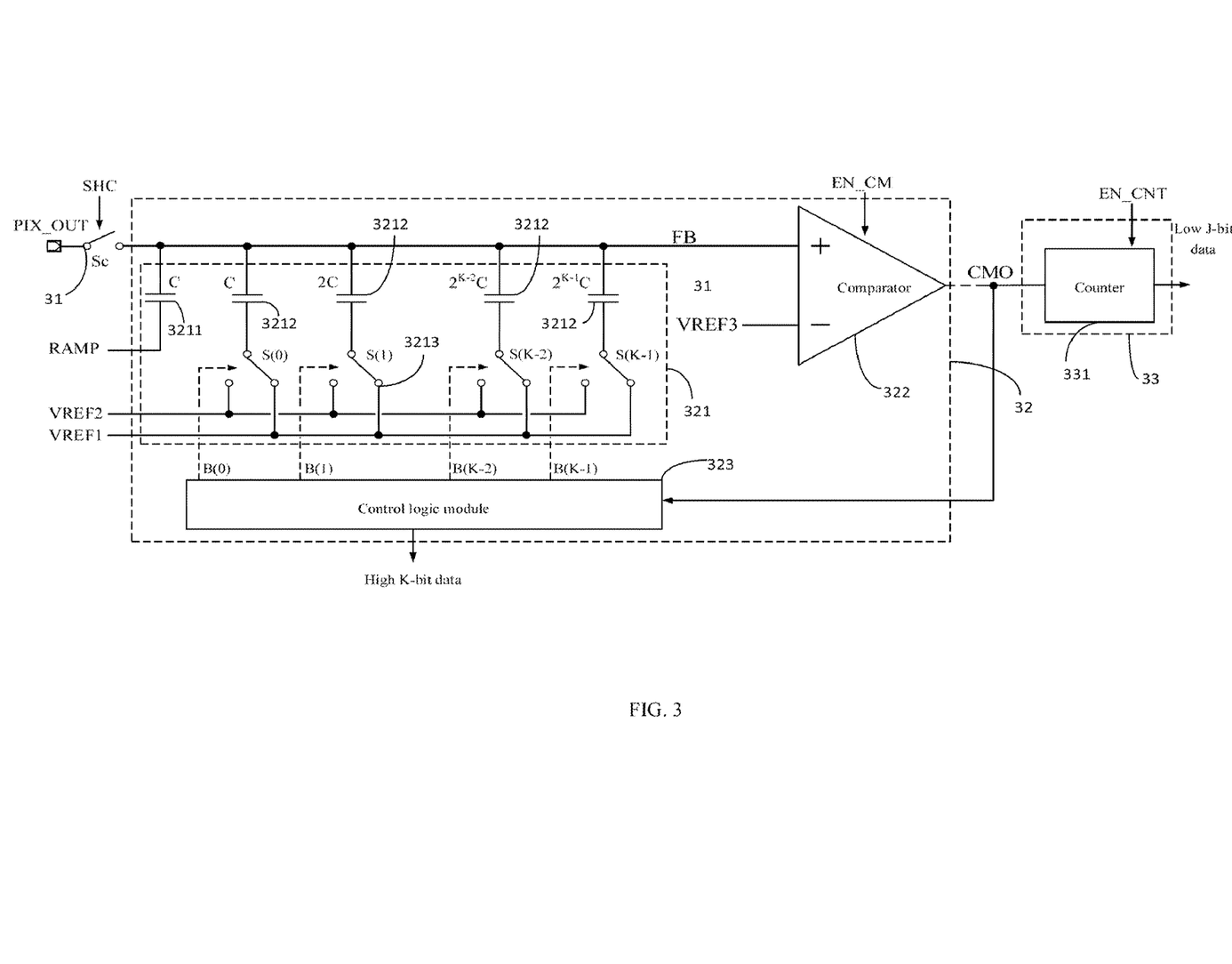
FIG. 3 is a circuit diagram of a read circuit for an image sensor in accordance with an embodiment of the disclosure.

To solve the problems existing in the prior art, an embodiment of the disclosure provides a read circuit for an image sensor, referring to FIG. 3, which includes:

a first analog-to-digital conversion unit 32 configured to perform successive approximation high-bit analog-to-digital conversion on collected pixel data to obtain high-bit conversion data and residual pixel data.

In some embodiments, the first analog-to-digital conversion unit 32 includes a switched capacitor array 321, a comparison module and a control logic module 323. The control logic module 323 is electrically connected to the switched capacitor array 321 so as to control a polar plate voltage of the switched capacitor array 321, a first input end of the comparison module is electrically connected to the switched capacitor array 321, a comparison reference voltage is input at a second input end of the comparison module so as to be compared with a voltage signal input at the first input end of the comparison module, and an output end of the comparison module is electrically connected to the control logic module 323 so as to output the high-bit conversion data via the control logic module 323.

A second analog-to-digital conversion unit 33 electrically connected to the first analog-to-digital conversion unit 32 and configured to perform single-slope low-bit analog-to-digital conversion on the residual pixel data to obtain low-bit conversion data.

In some embodiments, the second analog-to-digital conversion unit 33 includes a counting module, wherein the output end of the comparison module is connected to an input end of the counting module, and the counting module outputs the low-bit conversion data after stopping counting.

Wherein a sum of a first conversion accuracy of the first analog-to-digital conversion unit 32 and a second conversion accuracy of the second analog-to-digital conversion unit 33 is equal to a preset conversion accuracy for the pixel data.

In this embodiment, after collecting the pixel data, within the preset conversion accuracy, the first analog-to-digital conversion unit 32 performs successive approximation high-bit conversion on the collected pixel data to obtain the high-bit conversion data and the residual pixel data, and then the second analog-to-digital conversion unit 33 performs single-slope low-bit analog-to-digital conversion on the residual pixel data to obtain the low-bit conversion data, thereby completing the analog-to-digital conversion process of the pixel data. Compared with the traditional single-slope conversion mode, by combining a successive approximation conversion mode and a single-slope conversion mode, the data conversion cycle is greatly shortened, a high output frame rate is conveniently achieved under a high resolution, and the circuit power consumption and the circuit area are effectively reduced.

In some other embodiments, the switched capacitor array 321 includes a first capacitor 3211, K number of second capacitors 3212, and K number of changeover switches 3213, wherein K represents a positive integer. One end of the first capacitor 32111 and one end of each of the second capacitors 3212 are connected to the first input end, the other end of the first capacitor 3211 is used for the input of a ramp signal, and the other end of each of the second capacitors 3212 is electrically connected to a fixed end of one of the changeover switches. The changeover switch 3213 has at least two switching ends at which a first reference voltage and a second reference voltage are respectively input; and the control logic module 323 is electrically connected to the changeover switch 3213 so as to switch voltage signals input by the changeover switch 3213.

In some embodiments, a capacitance value of the first capacitor 3211 is C, a capacitance value of the i-th second capacitor 3212 is $2^{i-1}C$, wherein i is not less than 1 and not more than K, and both i and K are natural numbers.

In some embodiments, each of the second capacitors 3212 is in one-to-one correspondence with each of the changeover switches 3213, and the second reference voltage VREF2 is greater than the first reference voltage VREF1.

In some embodiments, the comparison reference voltage is equal to a difference between the first reference voltage VREF1 and the second reference voltage VREF2.

In some embodiments, the read circuit for the image sensor includes a control switch 31, and the control switch 31 is electrically connected to the first input end of the comparison module.

Illustratively, the comparison module is a comparator 322, the countering module is a counter 331, the K number of changeover switches 3213 in the switched capacitor array 321 are respectively marked as S(0), S(1), S(K−2), S(K−1), each changeover switch 3213 is connected to a lower plate of the corresponding second capacitor 3212, and upper plates of the first capacitor 3211 and the K number of second capacitors 3212 are connected to a positive input end FB of the comparator. The capacitance values of the first capacitor 3211 and the K number of second capacitors 3212 are distributed in a binary weighted mode, namely, C, C, 2C, 4C, . . . , $2^{K-2}C$, $2^{K-1}C$. Under the control of the control logic module 323, in addition to that the lower plate of the first capacitor 3211 is connected to the ramp signal RAMP, the lower plate of each of the other second capacitors 3212 is connected to the first reference voltage VREF1 or the second reference voltage VREF2, and a negative input end of the comparator 322 is connected to a comparison reference voltage VREF3, and VREF3=VREF2−VREF1. The switched capacitor array 321, the control logic module 323 and the comparator 322 form a high-K-bit SAR-ADC circuit, while the comparator 322 and the counter 331 form a low-J-bit SS-ADC circuit. Therefore, the read circuit for the image sensor perform is successive approximation A/D conversion on the collected pixel data to achieve K-bit conversion accuracy, and then performs single-slope A/D conversion with the J-bit accuracy on the residual pixel data. A high conversion frame rate can be achieved within a reasonable power consumption and area, and compared with the traditional single-slope AD conversion, the conversion cycle is greatly shortened, facilitating to achieve a high output frame rate under the high resolution.

Figure 4:
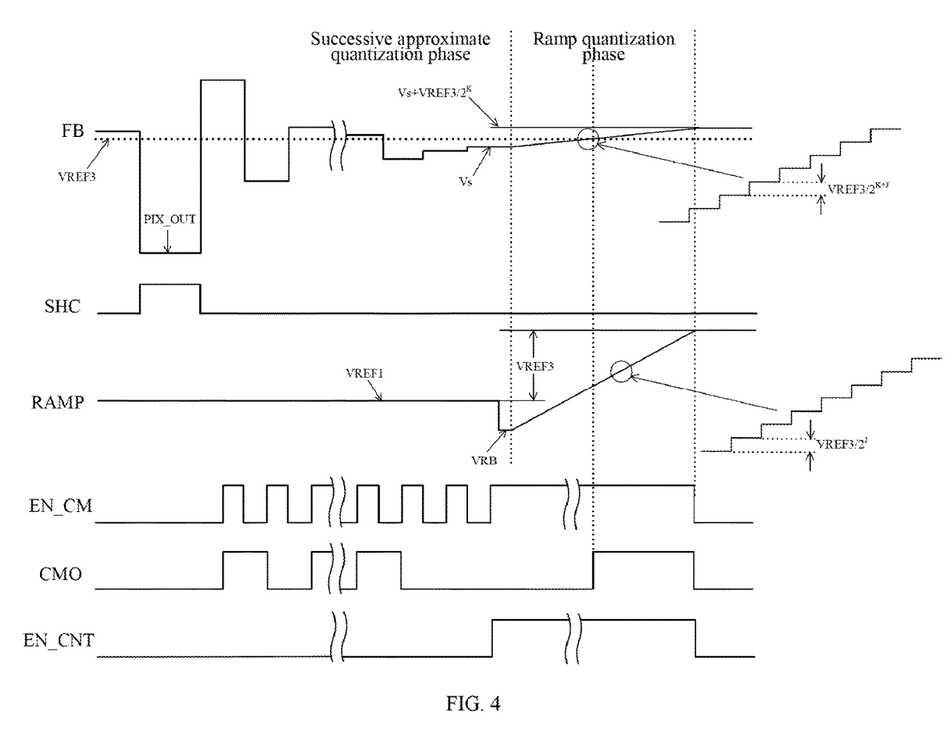
FIG. 4 is an operation sequence of a read circuit for an image sensor in accordance with an embodiment of the disclosure.

In order to further illustrate the read circuit for the image sensor in the technical solution, the sequence diagram is combined for specific illustration. Refer to FIG. 4, a signal read process of the read circuit is also divided into two signal read phases, namely, reset VRST and output integral VSIG, which have basically the same principle. The timing sequence in FIG. 4 illustrates a process of reading a VRST signal or a VSIG signal by the read circuit for the image sensor. Taking VRST read as an example, the high K-bit conversion of SAR-ADC (successive approximation quantization phase) is conducted at first. When the SHC (Sc control signal of a sampling switch) is high, the control switch 312 is turned on, the PIX_OUT is sampled to FB ends of the upper plates of the first capacitor 3211 and the K number of second capacitors 3212, while the lower plates of all second capacitors 3212 are connected to the VREF1. Therefore, at the moment, an electric potential of the ramp signal RAMP is VREF1, and an electric potential at the FB ends is the electric potential VRST of the PIX_OUT at the moment. Under the control of the control logic module 323, the lower plate of the capacitor with the maximum capacitance value $2^{K-1}C$ is changed from being connected to the VREF1 to being connected to the VREF2 (the VREF2 is the reference voltage higher than the VREF1), such that the electric potential at the FB ends is increased by (VREF2−VREF1)/2 (as the capacitance values of the second capacitors 3212 are distributed in a binary weighted mode, the electric potential at the FB ends may be changed by VREF3/2K as the capacitor with the minimum capacitance value C changes by VREF3 voltage) to become VRST+(VREF2−VREF1)/2=(VRST+VREF3)/2. The enable signal of the comparator 322 is a periodic pulse signal, and when the comparator 322 is enabled, the electric potential at the FB ends is compared with the VREF3 and then a judgment result CMO is output. While the SAR-ADC performs conversion bit by bit from the high bit to the low bit. During the conversion of a most significant bit, if (VRST+VREF3)/2>VREF3, the control bit B(K−1) of the most significant bit of the control logic module 323 is output as 1, and the lower plate of the capacitor with the maximum capacitance value $2^{K-1}C$ is connected to the VREF1. If (VRST+VREF3)/

2<VREF3, the control bit B (K−1) of the most significant bit of the control logic module 323 is output as 0, and the lower plate of the capacitor with the maximum capacitance value $2^{K-1}C$ is kept to be connected to the VREF2. During the conversion of a second significant bit, the capacitor with a second largest capacitance value $2^{K-2}C$ is connected to the VREF2, such that the electric potential at the FB ends may be increased by VREF3/4 on the basis of the electric potential after the MSB (most significant bit) judgment is finished; if the electric potential at the FB ends is higher than VREF3 at the moment, the control bit B(K−2) of the second significant bit of the control logic module 323 is output as 1, and the lower plate of the capacitor with a second largest capacitance value $2^{K-2}C$ is changed to be connected to the VREF1. Otherwise, if the electric potential at the FB ends is lower than VREF3 at the moment, the lower plate of the capacitor with the second largest capacitance value $2^{K-2}C$ is kept to be connected to the VREF2, and the control bit B(K−2) of the second significant bit of the control logic module 323 is output as 0. In a similar fashion, all high K−bit data are completely converted by the SAR-ADC, and the capacitor with the minimum capacitance value C is determined to be connected to the VREF2 or the VREF1, and the least significant bit B(0) may also output final data. After the high-K-bit conversion is finished, a residual voltage Vs may be left (i.e., the electric potential at the FB ends after the high-K-bit conversion is completed, the voltage of which ranging from VREF3-VREF3/$2^K$ to VREF3). The control logic module 323 is able to output the high-K-bit data.

Subsequently, the low J-bit SS-ADC conversion, i.e., the single-slope quantization phase, is conducted. The ramp signal RAMP firstly falls to VRB, and then gradually rises in a step mode to change from the VRB to the highest electric potential (i.e., the change range is VREF3), and the quantization accuracy is (VREF3)/$2^J$. Each change step size of the RAMP is (VREF3)/$2^J$, and has a total of 2J step signals. As the RAMP is connected to the capacitor with the minimum capacitance value C, i.e., the first capacitor 3211, by means of voltage division by the capacitor with the minimum capacitance value C, the change range at the FB ends is from Vs to Vs+(VREF3)/$2^K$, and one change step size of the FB ends at the low-J-bit conversion phase is VREF3/$2^{K+J}$. The enable signal EN_CM of the comparator is kept as high. After the enable signal EN_CNT of the counter 331 is high, the counter 331 starts counting, when the RAMP gradually changes to make the electric potential at the FB ends higher than the VREF3, the comparator 322 flips to change the CMO from low to high, and then the counter 311 stops counting and outputs the low-J-bit data. Then the high-K-bit and the low-J-bit data are unified as complete data corresponding to the VRST to be temporarily stored in a column register. Similarly, after the data conversion of the VSIG is completed, a column read circuit finally outputs the digital quantity corresponding to the VRST minus VSIG to a post-phase system, thus completing the read process of the pixel data.

In this embodiment, as the conversion of each bit of the SAR-ADC circuit only requires one clock cycle, the high-K-bit conversion only requires K number of clock cycles, and the low J-bit conversion requires $2^{J-1}$ number of clock cycles, thus a total of K+$2^{J-1}$ number of clock cycles is required. While the column read circuit of the traditional SS-ADC requires $2^{K+J}-1$ number of clock cycles for completing one ADC conversion. When the resolution of the ADC is relatively high (e.g., 12 bits), the read circuit for the image sensor provided by the disclosure has a significantly shorter conversion cycle, facilitating to achieve the higher frame rate. In a case that K=6 and J=6, one A/D conversion of the traditional SS-ADC requires 4095 cycles, while the SAR-SS-ADC requires 69 cycles, wherein the SAR-ADC high-bit conversion includes 6 cycles for a total of 6 µs (if the comparator of the SAR-ADC enables the clock frequency to be 1 MHz), the SS-ADC low-bit conversion includes 63 cycles for a total of 0.3 µs (if the clock frequency of the counter of SS-ADC conversion is 200 MHz). A total of 6.3 µs is required, while the traditional 12-bit SS-ADC requires 20.48 µs. On the other hand, a read circuit structure combining the SAR ADC with the SS-ADC provided by the disclosure gives consideration to the conversion speed and the area, which is more conducive to achieving CIS application with high resolution and high frame rate.

Figure 5:
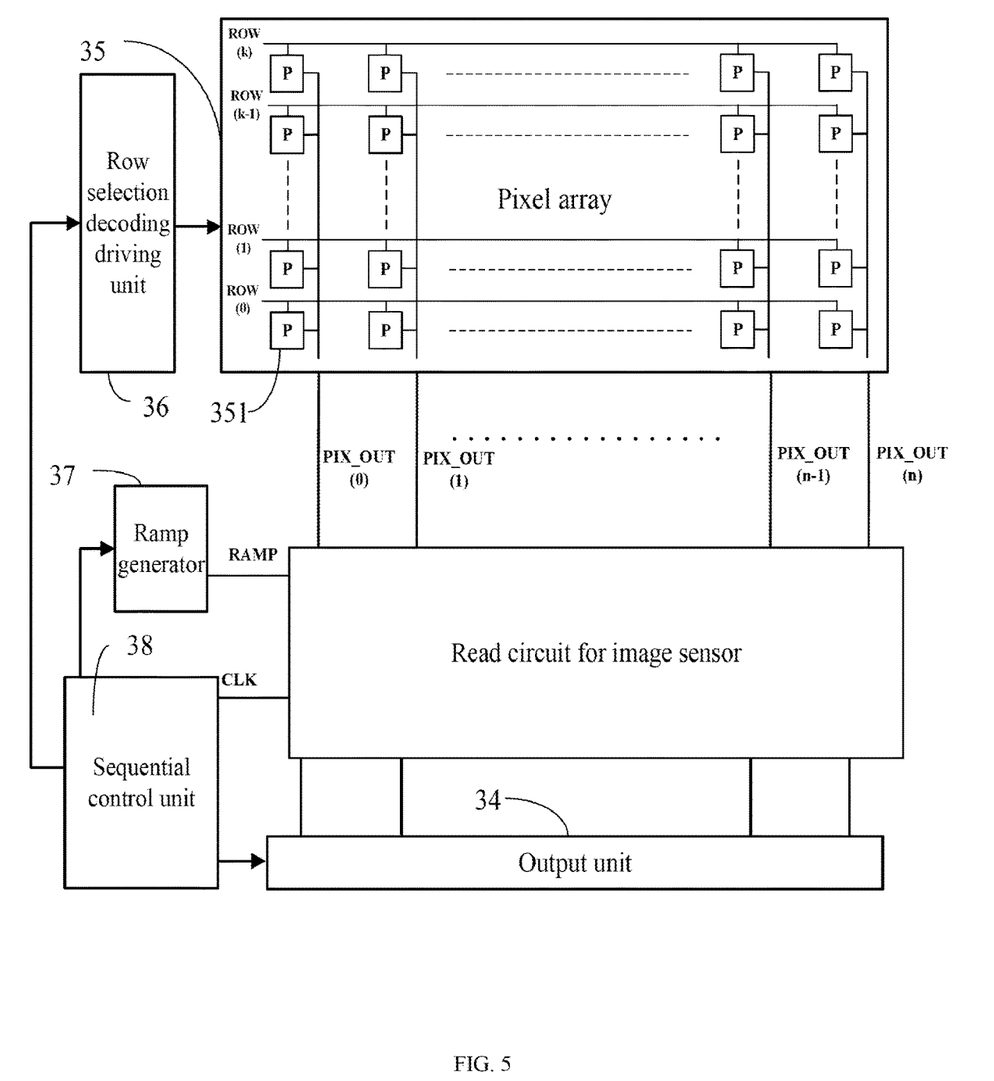
FIG. 5 is an overall circuit diagram of a read circuit for an image sensor in accordance with an embodiment of the disclosure.

In some embodiments, refer to FIG. 5, the read circuit for the image sensor further includes an output unit 34. The output unit 34 is electrically connected to the output end of the counting module and the output end of the control logic module 323 respectively so as to obtain the high-bit conversion data and the low-bit conversion data and to unify the high-bit conversion data and the low-bit conversion data into complete data corresponding to electric potential of the pixel data, therefore, the complete data can be temporarily stored in the column memory to facilitate to output the final data to the subsequent system.

Figure 6:
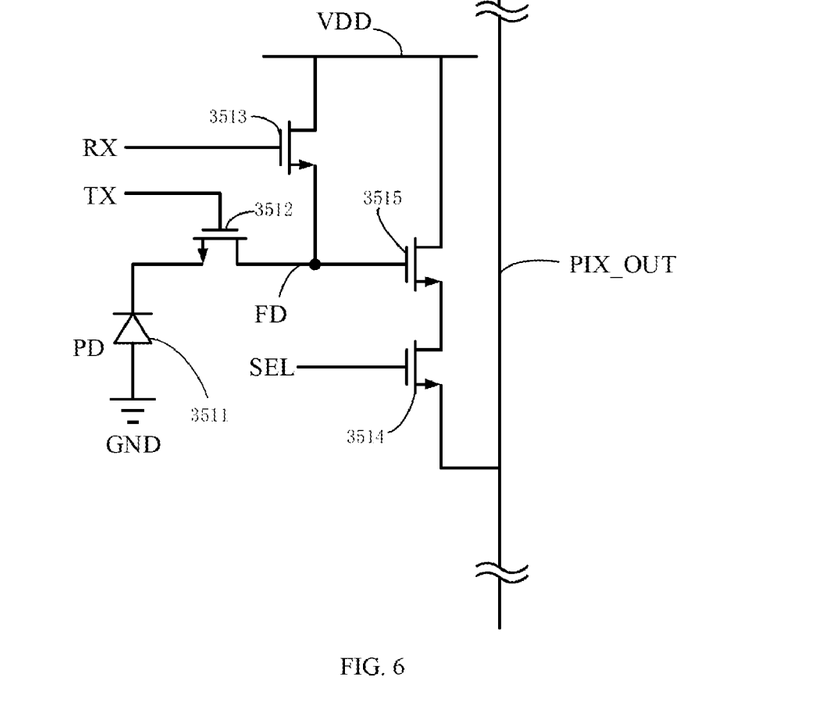
FIG. 6 is a circuit diagram of a pixel circuit in a pixel cell in accordance with an embodiment of the disclosure.

In some embodiments, refer to FIG. 6, the pixel cell 35 includes a plurality of pixel circuits 351 arranged in an array. Each pixel circuit 351 includes a photosensitive 3511, a transfer transistor 3512, a reset transistor 3513 a row selection transistor 3514 and an amplifying transistor 3515. An anode of the photosensitive diode 3511 is grounded, a cathode of the photosensitive diode 3511 is connected to a source electrode of the transfer transistor 3512, a drain electrode of the transfer transistor 3512 and a source electrode of the reset transistor 3513 are both connected to a gate electrode of the amplifying transistor 3515. A drain electrode of the reset transistor 3513 and the drain electrode of the amplifying transistor 3515 are both connected to an operating voltage, the gate electrode of the transfer transistor 3512 inputs a transmitting signal TX, the gate electrode of the reset transistor 3513 inputs a receiving signal RX, the gate electrode of the row selection transistor 3514 inputs a selective signal SEL, the source electrode of the row selection transistor 3514 is connected to a current source, the source electrode of the row selection transistor 3514 is connected to the current source, and the source electrode of the row selection transistor 3514 is connected to the PIX_OUT.

Wherein the photosensitive diode 3511 is configured to sense light and generate photoelectrons directly proportional to the light intensity. The transfer transistor 3512 has a function of transferring the photoelectrons in the photosensitive diode 3511. When the TX is a high potential, the transfer transistor 3512 is turned on to transfer the photoelectrons in the photosensitive diode 3511 to a floating node FD. The reset transistor 3513 has a function of resetting the floating node FD when the RX is a high potential. When the SEL is a high potential and the row selection transistor 3514 is turned on, the amplifying transistor 3515, the row selection transistor 3514 and the current source connected to ground form a path, at the moment, the amplifying transistor 3515 is essentially a source follower that follows the change in the electrode potential of the floating node FD, and the PIX_OUT is finally output.

Figure 7:
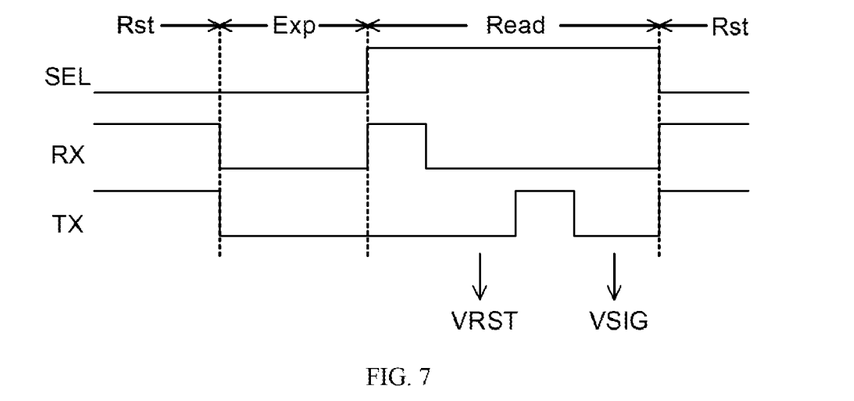
FIG. 7 is a sequence diagram of the pixel circuit in FIG. 6 in accordance with an embodiment of the disclosure.

Illustratively, in order to specifically illustrate the operation process of the pixel circuit 351, the operation sequence is combined for illustration. Refer to FIG. 7, the operation process of the pixel circuit 351 is divided into phases of reset (Rst), exposure (Exp) and signal read (Read). At the Rst phase, the TX and RX are "high", the transfer transistor 3512 and the reset transistor 3513 are both turned on, and the FD is reset, and the electric potential of the FD is pulled up to VDD. Then, the RX and TX are "low", the pixel circuit enters the Exp phase, and the photosensitive diode 3511 senses the light and accumulates electrons. Then the pixel circuit enters the Read phase, the SEL is "high", the RX is "high" to reset the FD, the RX is then pulled down to "low", the TX is kept "low", and at the moment, the amplifying transistor 3515 is controlled by the electric potential of the FD and outputs the reset electric potential VRST via the PIX_OUT. Afterwards, the TX is pulled up to "high" to transfer the electrons on the photosensitive diode 3511 to the FD, at the moment, the amplifying transistor 3515 is controlled by the electric potential of the FD and outputs the integral electric potential VSIG via the PIX_OUT. The VRST and VSIG electric potentials are read by the subsequent read circuit and converted into the digital quantity for a subtraction operation, thus obtaining the digital quantity in actual correspondence with the photoelectrons on the photosensitive diode 3511. If the conversion accuracy of the analog-to-digital ADC is 12 bits, and the reference voltage range of the ADC is VREF, the final output is DOUT= (VRST−VSIG)×$2^{12}$/VREF.

It needs to be noted that in this example, the CIS standard 4T pixel cell circuit structure is used for illustration. However, this solution can use either a 4T pixel cell or the pixel cells of other structures, the pixel cells of other structures have the similar operation process, and will not be repeated here.

In some embodiments, the read circuit for the image sensor further includes a row selection decoding driving unit 36, a ramp generator 37, and a sequential control unit 38; an output end of the ramp generator 37 is connected to the first capacitor 3211 to input the ramp signal, the output end of the sequential control unit 38 is connected to the input end of the ramp generator 37, and the sequential control unit 38 is connected to the input end of the row selection decoding driving unit 36, and the output end of the row selection decoding driving unit 36 is connected to the pixel cell 35.

While the embodiments of the disclosure have been described in detail, it will be apparent to those skilled in the art that various modifications and changes can be made to the embodiments. However, it is to be understood that such modifications and variations are within the scope and spirit of the disclosure as described in the appended claims. Furthermore, the disclosure described herein is susceptible to other embodiments and may be embodied or carried out in various ways.

What is claimed is:

1. A read circuit for an image sensor, comprising:
    a first analog-to-digital conversion unit, wherein the first analog-to-digital conversion unit performs successive approximation high-bit analog-to-digital conversion on collected pixel data to obtain high-bit conversion data and residual pixel data; and
    a second analog-to-digital conversion unit, wherein the second analog-to-digital conversion unit is electrically connected to the first analog-to-digital conversion unit, and the second analog-to-digital conversion unit performs single-slope low-bit analog-to-digital conversion on the residual pixel data to obtain low-bit conversion data,
    wherein a sum of a first conversion accuracy of the first analog-to-digital conversion unit and a second conversion accuracy of the second analog-to-digital conversion unit is equal to a preset conversion accuracy for the collected pixel data,
    wherein the successive approximation high-bit analog-to-digital conversion is firstly performed by the first analog-to-digital conversion unit, and the single-slope low-bit analog-to-digital conversion is then performed by the second analog-to-digital conversion unit,
    wherein, during the performance of the single-slope low-bit analog-to-digital conversion, a ramp signal of the second analog-to-digital conversion unit is firstly falls to a first predetermined voltage, and then gradually rises in a step mode to change from the first predetermined voltage to a second limited voltage, the second limited voltage having a value greater than that of the first predetermined voltage, and
    wherein, to complete one conversion by the read circuit, the read circuit is configured to:
        obtain the high-bit conversion data requires only K number of clock cycles, K represents a positive integer, and K is a number of changeover switches in a switched capacitor array of the first analog-to-digital conversion unit, and
        obtain the low-bit conversion data requires $2^{J-1}$ number of clock cycles, J represents a positive integer, and J is a number of bits in the residual pixel data.

2. The read circuit for the image sensor according to claim 1, wherein the first analog-to-digital conversion unit comprises the switched capacitor array, a comparison module, and a control logic module, wherein
    the control logic module is electrically connected to the switched capacitor array to control a polar plate voltage of the switched capacitor array;
    a first input end of the comparison module is electrically connected to the switched capacitor array;
    a comparison reference voltage is input at a second input end of the comparison module so as to be compared with a voltage signal input at the first input end of the comparison module; and
    an output end of the comparison module is electrically connected to the control logic module to output the high-bit conversion data via the control logic module.

3. The read circuit for the image sensor according to claim 2, wherein the switched capacitor array comprises a first capacitor, K number of second capacitors, and the K number of changeover switches, wherein
    a first end of the first capacitor and a first end of each of the second capacitors are connected to the first input end;
    a second end of the first capacitor is used for the input of a ramp signal;
    a second end of each of the second capacitors is electrically connected to a fixed end of one of the changeover switches,
    each of the changeover switches has at least two switching ends, wherein a first reference voltage and a second reference voltage are respectively input at the at least two switching ends; and
    the control logic module is electrically connected to the each changeover switch to switch voltage signals input by the each changeover switch.

4. The read circuit for the image sensor according to claim 3, wherein a capacitance value of the first capacitor is C, a capacitance value of an i-th second capacitor of the second capacitors is $2^{i-1}C$, wherein i is more than or equal to 1 and less than or equal to K, and i and K are natural numbers.

5. The read circuit for the image sensor according to claim 4, further comprising a row selection decoding driving unit, a ramp generator, and a sequential control unit, wherein
an output end of the ramp generator is connected to the first capacitor to input the ramp signal;
an output end of the sequential control unit is connected to an input end of the ramp generator;
the sequential control unit is connected to an input end of the row selection decoding driving unit; and
an output end of the row selection decoding driving unit is connected to a pixel cell.

6. The read circuit for the image sensor according to claim 3, wherein each of the second capacitors is in one-to-one correspondence with each of the changeover switches, and the second reference voltage is greater than the first reference voltage.

7. The read circuit for the image sensor according to claim 6, further comprising a row selection decoding driving unit, a ramp generator, and a sequential control unit, wherein
an output end of the ramp generator is connected to the first capacitor to input the ramp signal;
an output end of the sequential control unit is connected to an input end of the ramp generator;
the sequential control unit is connected to an input end of the row selection decoding driving unit; and
an output end of the row selection decoding driving unit is connected to a pixel cell.

8. The read circuit for the image sensor according to claim 3, wherein the comparison reference voltage is equal to a difference between the first reference voltage and the second reference voltage.

9. The read circuit for the image sensor according to claim 8, further comprising a row selection decoding driving unit, a ramp generator, and a sequential control unit, wherein
an output end of the ramp generator is connected to the first capacitor to input the ramp signal;
an output end of the sequential control unit is connected to an input end of the ramp generator;
the sequential control unit is connected to an input end of the row selection decoding driving unit; and
an output end of the row selection decoding driving unit is connected to a pixel cell.

10. The read circuit for the image sensor according to claim 3, further comprising a control switch, wherein the control switch is electrically connected to the first input end of the comparison module.

11. The read circuit for the image sensor according to claim 3, further comprising a row selection decoding driving unit, a ramp generator, and a sequential control unit, wherein
an output end of the ramp generator is connected to the first capacitor to input the ramp signal;
an output end of the sequential control unit is connected to an input end of the ramp generator;
the sequential control unit is connected to an input end of the row selection decoding driving unit; and
an output end of the row selection decoding driving unit is connected to a pixel cell.

12. The read circuit for the image sensor according to claim 2, wherein the second analog-to-digital conversion unit comprises a counting module, wherein
the output end of the comparison module is connected to an input end of the counting module, and the counting module outputs the low-bit conversion data after the counting module stops counting.

13. The read circuit for the image sensor according to claim 12, further comprising an output unit, wherein
the output unit is electrically connected to an output end of the counting module and an output end of the control logic module respectively to obtain the high-bit conversion data and the low-bit conversion data and unify the high-bit conversion data and the low-bit conversion data into complete data corresponding to an electric potential of the collected pixel data.

\* \* \* \* \*